US006725427B2

(12) United States Patent
Freeman et al.

(10) Patent No.: US 6,725,427 B2
(45) Date of Patent: Apr. 20, 2004

(54) DOCUMENT STREAM OPERATING SYSTEM WITH DOCUMENT ORGANIZING AND DISPLAY FACILITIES

(75) Inventors: Eric Freeman, Branford, CT (US); David H. Gelernter, Woodbridge, CT (US)

(73) Assignee: Mirror Worlds Technologies, Inc., New Haven, CT (US)

( * ) Notice: Subject to any disclaimer, the term of this patent is extended or adjusted under 35 U.S.C. 154(b) by 76 days.

(21) Appl. No.: 10/013,150

(22) Filed: Dec. 10, 2001

(65) Prior Publication Data

US 2002/0046220 A1 Apr. 18, 2002

Related U.S. Application Data

(62) Division of application No. 09/398,611, filed on Sep. 17, 1999, now Pat. No. 6,638,318, which is a continuation of application No. 08/673,255, filed on Jun. 28, 1996, now Pat. No. 6,006,227.

(51) Int. Cl.[7] .............................................. G06F 17/21
(52) U.S. Cl. ..................................................... 715/526
(58) Field of Search ................................ 715/500, 511, 715/512, 526; 707/7, 2, 102

(56) References Cited

U.S. PATENT DOCUMENTS

| 5,060,135 | A | 10/1991 | Levine et al. |
|---|---|---|---|
| 5,063,495 | A | 11/1991 | MacPhail |
| 5,140,676 | A | 8/1992 | Langelaan |
| 5,150,410 | A | 9/1992 | Bertrand |
| 5,159,669 | A | 10/1992 | Trigg et al. |
| 5,241,671 | A | 8/1993 | Reed et al. |
| 5,247,437 | A | 9/1993 | Vale et al. |
| 5,283,864 | A | 2/1994 | Knowlton |
| 5,287,448 | A | 2/1994 | Nicol et al. |
| 5,297,032 | A | 3/1994 | Trojan et al. |
| 5,402,526 | A | 3/1995 | Bauman et al. |
| 5,430,710 | A | 7/1995 | Mueller et al. |
| 5,448,729 | A | 9/1995 | Murdock |
| 5,530,859 | A | 6/1996 | Tobias, II et al. |
| 5,535,063 | A | 7/1996 | Lamming |
| 5,589,892 | A | 12/1996 | Knee et al. |
| 5,613,134 | A * | 3/1997 | Lucus et al. ................. 715/526 |
| 5,616,876 | A | 4/1997 | Cluts |
| 5,625,818 | A | 4/1997 | Zarmer et al. |
| 5,649,182 | A | 7/1997 | Reitz |
| 5,701,582 | A | 12/1997 | DeBey |
| 5,835,129 | A | 11/1998 | Kumar |
| 5,890,177 | A | 3/1999 | Moody et al. |
| 5,912,668 | A * | 6/1999 | Sciammarella et al. ..... 345/788 |
| 6,243,724 | B1 | 6/2001 | Mander et al. |

OTHER PUBLICATIONS

Gelernter, David, *The Cyber–Road Not Taken*, The Washington Post, Apr. 3, 1994.

Nelson, Theodor H., *The Right Way To Think About Software Design*, In The Art of Human–Computer Interface Design, Brenda Laurel, (Ed.), (1990): pp. 235–243.

Landsdale, M., *The Psychology Of Personal Information Management*, Applied Ergonomics,(Mar. 1988): pp. 55–66.

(List continued on next page.)

*Primary Examiner*—Stephen S. Hong
(74) *Attorney, Agent, or Firm*—Cooper & Dunham LLP

(57) ABSTRACT

A document stream operating system and method is disclosed in which: (1) documents are stored in one or more chronologically ordered streams; (2) the location and nature of file storage is transparent to the user; (3) information is organized as needed instead of at the time the document is created; (4) sophisticated logic is provided for summarizing a large group of related documents at the time a user wants a concise overview; and (5) archiving is automatic. The documents can include text, pictures, animations, software programs or any other type of data.

39 Claims, 6 Drawing Sheets

OTHER PUBLICATIONS

Malone, Thomas W., *How Do People Organize Their Desks? Implications For The Design Of Office Information Systems.*, ACM Transactions On Office Systems, vol. 1, No. 1 (Jan. 1983): pp. 99–112.

Gelernter, The Cyber–Road Not Taken, The Washington Post, Apr. 3, 1994, 9 pgs.

Freeman, Lifestreams Project Home Page, 3 pgs., 1994–1996.

Freeman, Lifestreams for the Newton, Steve Mann's Developer Corner, Oct. 1995, 5 pgs.

Steinberg, Lifestreams, WIRED 5.02, Feb. 1997, 11 pgs.

Freeman et al, Lifestreams: Organizing your Electronic Life, AAA1 Fall Symposium, A1 Applications in Knowledge Navigation and Retrieval, Nov. 1995, Cambridge MA, 6 pgs.

Getting Results with Microsoft Outlook, copyright Microsoft Corporation 1995–1996, pgs. 28–29.

Cowart, Mastering Windows 3.1, 992, chapter 12, pp. 396–417.

* cited by examiner

| WHO | ON | | | | | | AT | ABOUT |
|---|---|---|---|---|---|---|---|---|
| Scott Fertig | Tue | Aug | 1 | 12:05 | EDT | 1995 | 432-6433 | Port to PPC |
| Ward Mullins | Tue | Aug | 1 | 11:57 | EDT | 1995 | 415 224-1912 | Tcl/Java discussion |
| Beth Freeman | Tue | Aug | 1 | 10:22 | EDT | 1995 | 432-1287 | insurance |

```
Quote-O-Matic Stock Service for 5/16/95

GVIL      14.00
LMASX     20.84
ODWA      18.50
SPLS      27.12
TSA       19.25
lavtx     21.41
```

DOCUMENT STREAM OPERATING SYSTEM WITH DOCUMENT ORGANIZING AND DISPLAY FACILITIES

This application is a divisional of application Ser. No. 09/398,611, filed Sep. 17, 1999, now U.S. Pat. No. 6,638,318 which is a continuation of application Ser. No. 08/673,255, filed Jun. 28, 1996, now U.S. Pat. No. 6,006,227.

FIELD OF THE INVENTION

The present invention relates to an operating system in which documents are stored in a chronologically ordered "stream". In other words, that is, as each document is presented to the operating system, the document is placed according to a time indicator in the sequence of documents already stored relative to the time indicators of the stored documents.

Within this application several publications are referenced by arabic numerals within parentheses. Full citations for these and other references may be found at the end of the specification immediately preceding the claims. The disclosures of all of these publications in their entireties are hereby incorporated by reference into this application in order to more fully describe the state of the art to which this invention pertains.

BACKGROUND OF THE INVENTION

Conventional operating systems frequently confuse inexperienced users because conventional operating systems are not well suited to the needs of most users. For example, conventional operating systems utilize separate applications which require file and format translations. In addition, conventional operating systems require the user to invent pointless names for files and to construct organizational hierarchies that quickly become obsolete. Named files are an invention of the 1950's and the hierarchical directories are an invention of 1960's.

Some conventional operating systems employ a "desktop metaphor" which attempts to simplify common file operations by presenting the operations in the familiar language of the paper-based world, that is, paper documents as files, folders as directories, a trashcan for deletion, etc. Also, the paper-based model is a rather poor basis for organizing information where the state of the art is still a messy desktop and where one's choices in creating new information paradigms is constrained [1].

Thus, conventional operating systems suffer from at least the following disadvantages: (1) a file must be "named" when created and often a location in which to store the file must be indicated resulting in unneeded overhead; (2) users are required to store new information in fixed categories, that is directories or subdirectories, which are often an inadequate organizing device; (3) archiving is not automatic; (4) little support for "reminding" functions are provided; (5) accessibility and compatibility across data platforms is not provided and (6) the historical context of a document is lost because no tracking of where, why and how a document evolves is performed.

"Naming" a file when created and choosing a location in which to place the file is unneeded overhead: when a person grabs a piece of paper and starts writing, no one demands that a name be bestowed on the sheet or that a storage location be found. Online, many filenames are not only pointless but useless for retrieval purposes. Storage locations are effective only as long as the user remembers them.

Data archiving is an area where conventional electronic systems perform poorly compared to paper-based systems. Paper-based systems are first and foremost archiving systems, yet data archiving is difficult in conventional desktop systems. Often, users throw out old data rather than undertaking the task of archiving and remembering how to get the data back. If archiving and retrieval of documents is convenient, old information could be reused more often.

Reminding is a critical function of computer-based systems [2] [3], yet current systems supply little or no support for this function. Users are forced either to use location on their graphical desktops as rewinding cues or to use add-on applications such as calendar managers.

A solution to these disadvantages is to use a document stream operating system. One such system is outlined in a 1994 article [4]. However, this article fails to address many of the disadvantages of conventional operating systems.

SUMMARY OF THE INVENTION

One object of the present invention is to provide a document stream operating system and method which solves many, if not all, of the disadvantages of conventional operating systems.

Another object of the present invention is to provide a document stream operating system in which documents are stored in one or more chronologically ordered streams.

An additional object of the present invention is to provide an operating system in which the location and nature of file storage is transparent to the user, for example, the storage of the files is handled automatically and file names are only used if a user chooses to invent such names.

A further object of the present invention is to provide an operating system which takes advantage of the nature of electronic documents. For example, a conventional paper document can only be accessed in one place, but electronic documents can be accessed from multiple locations.

Another object of the present invention is to organize information as needed instead of at the time the document is created. For example, streams may be created on demand and documents may belong to as many streams as seems reasonable or to none.

An additional object of the present invention is to provide an operating system in which archiving is automatic.

A further object of the present invention is to provide an operating system with sophisticated logic for summarizing or compressing a large group of related documents when the user wants a concise overview. In addition, this summarizing can include pictures, sounds and/or animations. Also, no matter how many documents fall into a given category, the operating system is capable of presenting an overview in a form so that all the documents are accessible from a single screen.

Also, an object of the present operating system is to make "reminding" convenient.

Another object of the present invention is to provide an operating system in which personal data is widely accessible anywhere and compatibility across platforms is automatic. Accordingly, this invention provides that computers using the operating system of the present invention need not be independent data storage devices, but also act as "viewpoints" to data store, and maintained on external systems such as the INTERNET. Thus, in accordance with the present invention users can access their personal document streams from any available platform such as a UNIX machine, a Macintosh or IBM-compatible personal computer, a personal digital assistant (PDA), or a set-top box via cable.

According to one embodiment of the invention a computer program for organizing one or more data units is provided. The computer program includes: (1) means for receiving one or more of the data units, each of which is associated with one or more chronological indicators; and (2) means for linking each of the data units according to the chronological indicators to generate one or more streams of data units. Other embodiments of the invention also provide: (1) chronological indicators including past, present, and future times; and (2) means for displaying the streams, wherein respective indicia representing the data units are displayed and each data unit includes textual data, video data, audio data and/or multimedia data. The means for displaying the streams may further include displaying selected segments of the streams corresponding to selected intervals of time. The means for receiving may further include means for receiving data units from the Word Wide Web or from a client computer.

According to another embodiment of the invention, a method of organizing one or more data units is provided including the steps of: (1) receiving on or more data units, each of which is associated with one or more chronological indicators; and (2) linking each of the data units according to the chronological indicators to generate one or more streams of data units. In other embodiments, the chronological indicators may include past, present, and future times. The method may further include the steps of: (1) displaying the streams, wherein respective indicia represent each data unit and each of the data units may be textual data, video data, audio data and/or multimedia data. The step of displaying the streams may further include the steps of: (1) receiving from a user one or more values indicative of one or more selected segments of the streams corresponding to selected intervals of time; and (2) displaying the segments of the streams corresponding to the selected intervals of time.

These and other advantages of the present invention will become apparent from the detailed description accompanying the claims and the attached figures.

DETAILED DESCRIPTION OF THE PREFERRED EMBODIMENTS

Figure 1:
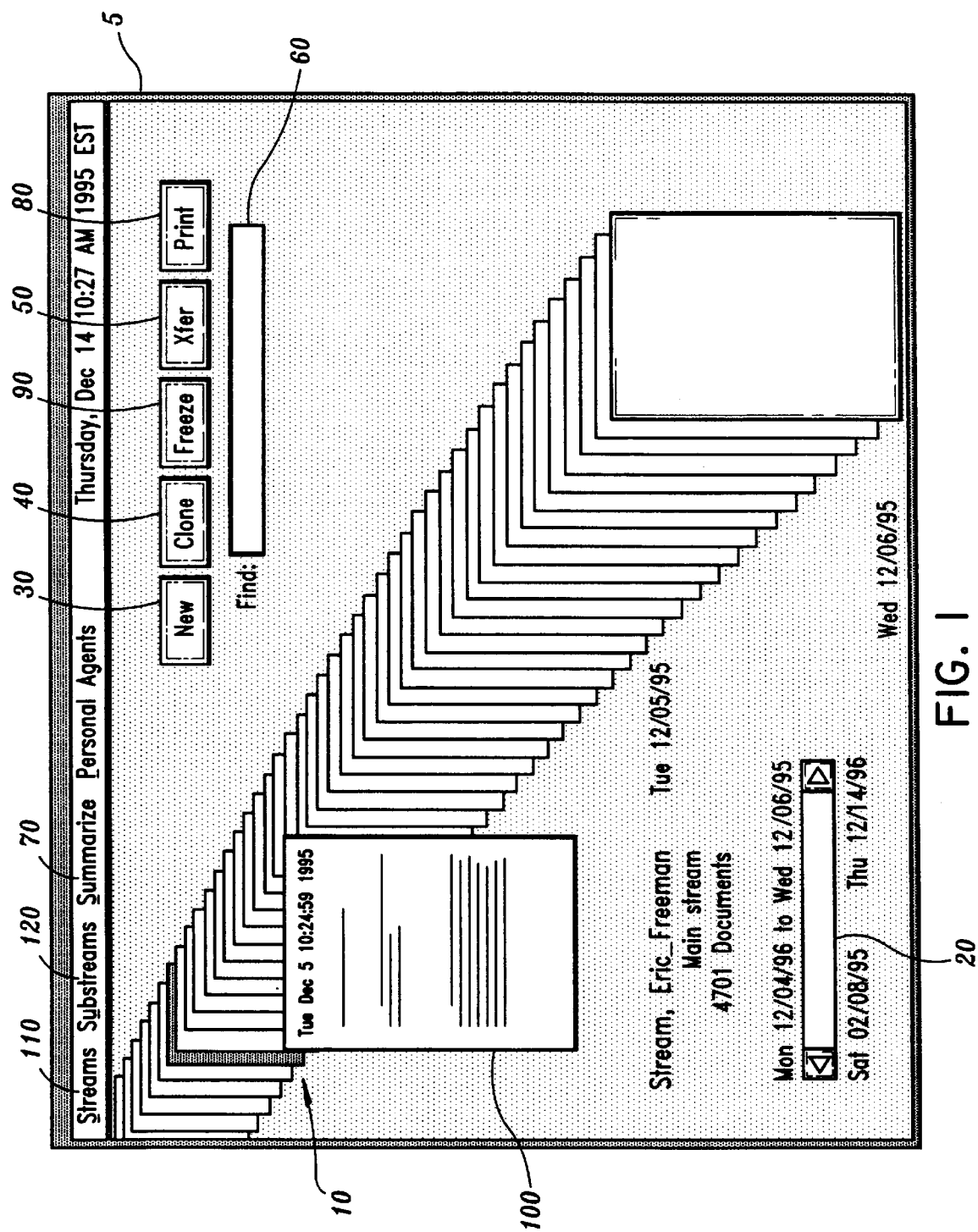
FIG. 1 shows a viewport in one embodiment of the present invention.

This invention is a new model and system for managing personal electronic information which uses a time-ordered stream as a storage model and stream filters to organize, locate, summarize and monitor incoming information. Together, streams and filters provide a unified framework that subsumes many separate desktop applications to accomplish and handle personal communication, scheduling, and search and retrieval tasks. One embodiment of the present invention utilizes a machine-independent, client/server open architecture so that users can continue to use the same conventional document types, viewers and editors.

A "stream" according to the present invention is a time-ordered sequence of documents that functions as a diary of a person or an entity's electronic life. Every document created and every document send to a person or entity is stored in a main stream. The tail of a stream contains documents from the past, for example starting with an electronic birth certificate or articles of incorporation. Moving away from the tail and toward the present and future, that is, toward head of the stream more recent documents are found including papers in progress or new electronic mail. A document can contain any type of data including but not limited to pictures, correspondence, bills, movies, voice mail and software programs. Moving beyond the present and into the future, the stream contains documents allotted to future times and events, such as, reminders, calendar items and to-do lists.

Time-based ordering is a natural guide to experience. Time is the attribute that comes closest to a universal skeleton-key for stored experience. Accordingly, streams add historical context to a document collection with all documents eventually becoming read-only, analogously as history becomes "set in stone". The stream preserves the order and method of document creation. Also, like a diary, a stream records evolving work, correspondence and transactions because historical context can be crucial in an organizational setting.

One embodiment of this invention allows for basic operations to be perform on a stream: new, clone, transfer, find and summarize.

Users create documents by means of the new and clone operations. New creates a new, empty document and adds the document to the main stream. Clone duplicates an existing document and adds the duplicate to the main stream at a new time point. Documents can also be created indirectly through the transfer operation. The transfer operation copies a document from one stream to another stream. Creation of a document if "transparent" because documents, by default, are added to the at the present time point. Internally, the document is identified by a time indication so no name is required from the user for the document. Nevertheless, a user can optionally name a document is desired.

Some streams can be organized on the fly with the find operation. Find prompts for a search query, such as "all E-mail I haven't responded to," or "all faxes I've sent to Schwartz" and creates a substream. Substreams, unlike conventional, virtual or fixed directories which only list filenames, present the user with a stream "view" of a document collection. This view, according to the present invention contains all documents that are relevant to the search query. Also, unlike searches of conventional fixed directories, the substream is generated by default from all the documents in the main stream. Accordingly, individual substreams may overlap, that is, contain some documents that are the same and can be created and destroyed on the fly without affecting the main stream or other substreams.

The find operation creates a substream of the main stream or of another substream based on, for example, a boolean attribute-and-keyword expression or a 'chronological expression', for example, "my last letter to Schwartz". Also, substreams may point to the future, for example, "my next appointment".

Once created, substreams operate dynamically, that is, if a user allows a substream to persist, the substream will collect new documents that match the search criteria as documents arrive from outside the operating system or as the user creates the document. This dynamic operation provides automatic monitoring of information because the substream not only organizes the documents as received but also filters for incoming information. For example, a substream created with the query "find all documents created by other people" would subsume a user's mailbox and automatically collect all arriving mail from other users. A substream remains in existence until destroyed by the user and acts as a filter by examining each new document that enters the main stream.

Although a document may belong to any number of substreams, the document also enters and remains on the main stream. A substream, in other words, is a "subset" of the main stream document collection. In other words, a way of looking at the main stream so as to exclude certain documents temporarily.

The summarize operation "compresses" or "squish" a stream to generate one or more overview documents. The content of an overview document depends on the type of documents in the stream. For instance, if the stream contains the daily closing prices of all the stocks and mutual funds in a user's investment portfolio, the overview documents may contain a chart displaying the historical performance of particular securities and the user's net worth. As another example, if the substream contains a list of tasks a user needs to complete, the overview document might display a prioritized "to-do" list. Thus, the summarize operation collapses a stream into a summary document. This summary document is a "live" document which is updated as additional documents are added to the main stream.

The type of summary depends on the type of documents in the substream. In one embodiment of the present invention at least one general "squish" function is provided no matter which stream is to be squished. Typically, however, the user will have a number of different squishers to choose from, for example, one squisher might produce a summary in words, while another squisher might produce a graph. Also "custom squishers" may be supplied by third parties or created by the user.

Another aspect of the invention is that applications execute "inside" a stream document leaving any output in that document. Thus, running an application is a variant of the new operation. For example, to run a spreadsheet application such as Lotus 1-2-3, a user creates a new document at the head of the main stream, specifically, a "live" spreadsheet document. The application itself is stored on the main stream, or located by means of a calling card that points to another stream containing the application.

A stream has three main portions: past, present, and future. The "present" portion of the stream holds "working documents", which also includes the timepoint in the stream where new documents are created and where incoming documents are placed. As documents age and newer documents are added, older documents pass from the user's view and enter the "past portion"where the documents are eventually "archived". By disappearing from view old information is automatically cleared away so the old information will not clutter up the workspace. At some future point if documents in the past portion are needed, such documents can be located with the find operation even if the past document has already been archived.

The "future" portion of the stream allows documents to be created in the future. Future creation is a natural method of posting reminders, for example, meeting dates and scheduling information. The system allows users to dial to the future by selecting a future timepoint for a document. The present invention keeps the document until that future time occurs. When the time of documents timepoint arrives the reminder document is brought into view and the document enters the present portion of the stream.

One embodiment of the present invention is implemented in a client/server architecture running over the Internet. The server is the workhorse of this embodiment handling one or more streams by storing all main stream and substream documents. Each view of a stream is implemented as a client of the server and provides the user with a "viewpoint" interface to document collections, that is, streams. The "look and feel" of the viewport may be different for different computing platforms but each viewport should support the basic operations.

One embodiment of the present invention implements a client viewport using graphically based X Windows, another embodiment implement a client viewport solely with text in standard ASCII (American Standard Characters for Information Interchange) and yet another embodiment implements a client viewport for the NEWTON personal digital assistant (PDA). The X Windows viewport provides the full range of functionalities including picture and movie display. In contrast the text-only viewport has a mail-like interface although all the basic operations are available. Also, because the NEWTON PDA lacks substantial internal memory and relies on slow external communications, that is low bandwidth, a minimal stream-access method is provided.

The X Windows viewport embodiment is shown in FIG. 1. The interface is based on a visual representation of the stream metaphor 5. Users can slide the mouse pointer 10 over the document representations to "glance" at each document, or use the scroll bar 20 in the lower left-hand corner to move through time, either into the past or into the future portion of the stream.

Color and animation indicate important document features. A red border in one embodiment means "unseen" and a blue border means "writable". Open doc documents may be offset to the side to indicate when the document is being edited. In this embodiment incoming documents slide in from the left side and newly created documents pop down from the top and push the steam backwards by one document into the past.

External applications are used to view and edit documents which the user can select by clicking on the documents graphical representation. The external applications speed the learning process significantly because new users can continue to use familiar applications for example, conventional UNIX application such as emacs, xv, and ghostview, to create and view documents while using streams to organize and communicate the documents.

The X Windows interface prominently displays the basic operations, that is, New 30, Clone 40, Xfer 50 (that is, transfer), Find 60, and Summarize 70 as buttons and/or menus. As discussed previously the New button creates a new document and adds the document to the stream at the "present" timepoint. The Clone button duplicates an existing document and places the copy in the stream. The Xfer button first prompts the user for one or more mail addresses and then forwards the selected document. The find operation is supported through a text entry box 60 that allows the user to enter a boolean search query which results in a new substream being created and displayed. The summarize menu 70 generates a new document which displays information from documents in a stream in a desired format, for example, a graph.

The X Windows interface of this document also provides additional buttons. The Print button 80 copies a selected document to a printer where documents may be either printed conventionally or moved to a printer stream. A software agent which can be associated with the stream forwards each new document to an appropriate printer. The Freeze button 90 makes a document read-only.

Pulldown menus are used to select documents from streams or existing substreams, create summaries, initiate personal agents and change the clock.

The Streams menu 110 allows the user to select from a list of locally available streams.

Figure 2:
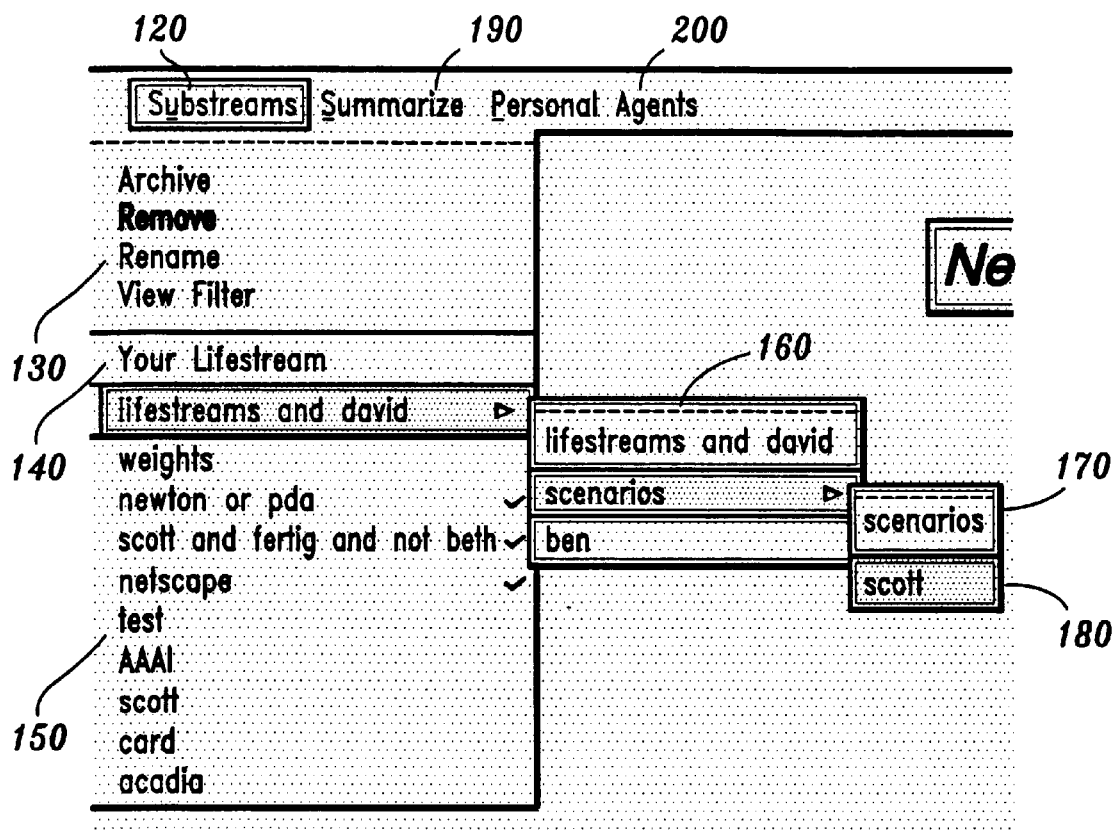
FIG. 2 shows a substream menu in one embodiment of the present invention.

FIG. 2 shows the Substreams menu 120 of one embodiment of the present invention. This menu is divided into three sections. The first section 130 contains a list of operations that can be performed on substreams, for example, remove. The second section 140 contains one menu entry labeled "Your Lifestream", and causes the viewport to display a user's main stream. The third section 150 lists all of the user's substreams. As indicated by this third section, substreams can be created in an incremental fashion, that is, one substream generated from another resulting in a nested set of menus. In this example the nested menus were created by first creating a substream "lifestreams and david" 160 from the main stream and then creating two substreams from this substream, "scenarios" and "ben" 170. Substream "scott" 180 was created from the "scenarios" substream. Semantically this incremental substreaming amounts to a boolean 'and' of each new query with the previous substream's query.

Figure 3:
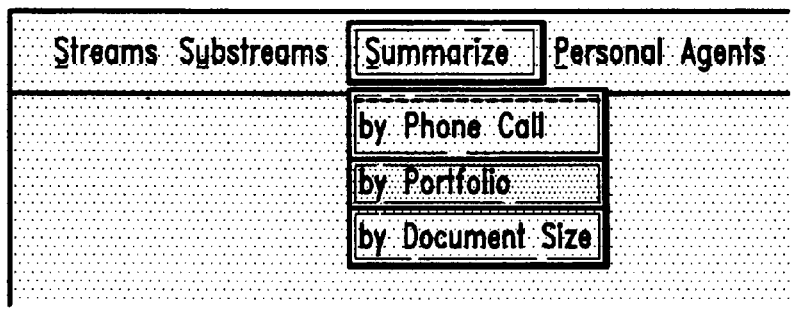
FIG. 3 shows a list of summary types for the substream chosen in FIG. 2 of the present invention.

FIG. 3 shows the summarize menu 190 which lists the possible summary types. Choosing any of these menu options creates a substream summary and a new document containing the summary is placed on the stream.

The Personal Agents menu 200 lists a number of available software agent types. Personal software agents can be added to the user interface in order to automate common tasks.

Figure 4:
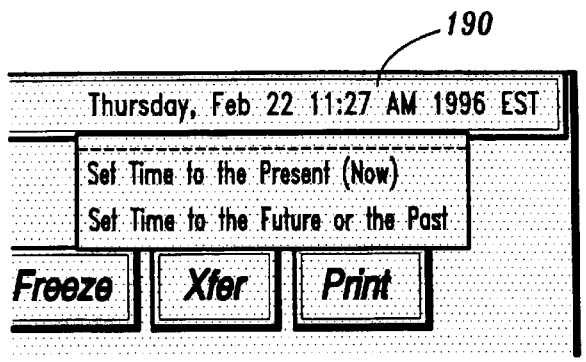
FIG. 4 shows the time display in one embodiment of the present invention.
Figure 5:
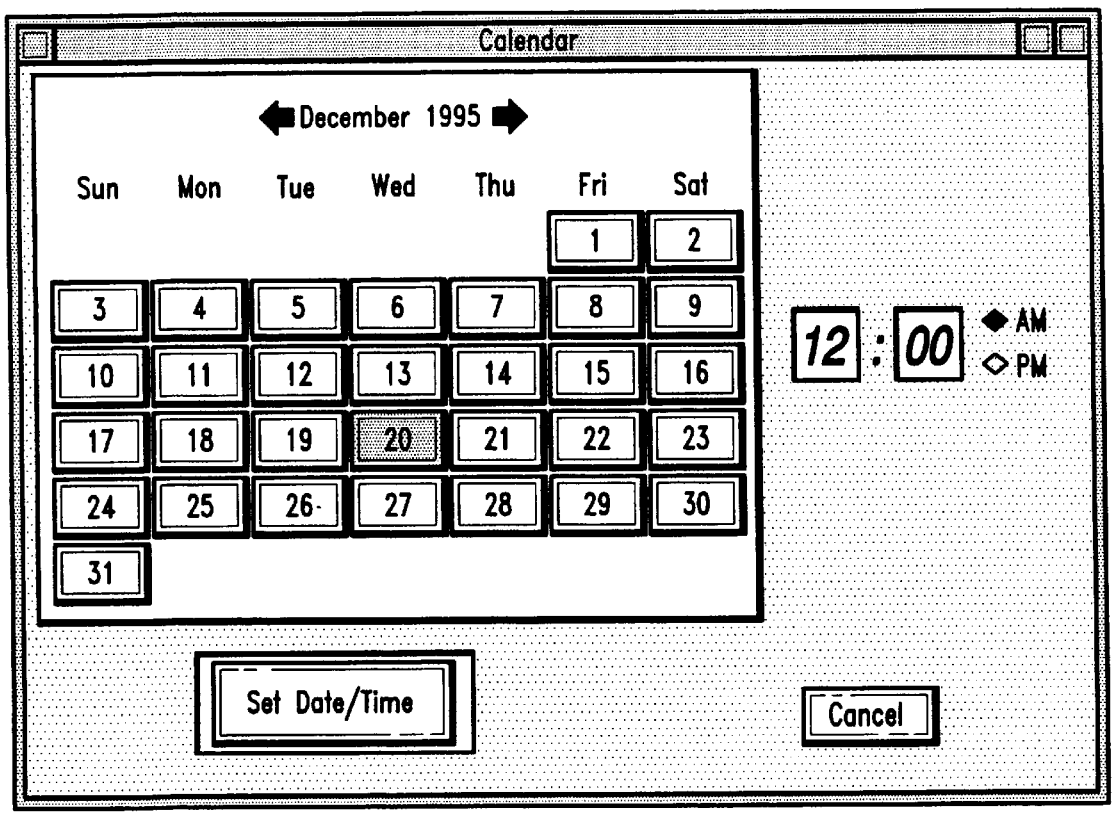
FIG. 5 shows a calendar-based dialog box in one embodiment of the present invention.

The embodiment illustrated in FIG. 4 always displays the time in the upper right hand corner of the viewport interface. This time display also acts as a "time" pull-down menu 190 that allows the user to set the viewport time to the future or past via a calendar-based dialog box as illustrated in FIG. 5. Setting the viewport time causes the cursor to point to that timepoint position in the stream such that all documents forward of that timepoint, that is, towards the head of the stream have a future timestamp and all documents behind that timepoint, that is, towards the tail, have a past timestamp. As time progresses, this cursor moves forward towards the head of the stream. When the cursor slips in front of the present timepoint "future" documents are added to the visible part of the stream in the viewport, just like new mail arrives.

The effect of setting the time to the future or past is to reset the time-cursor temporarily to a fixed position designated by the user. Normally the user interface displays all documents from the past up to the time-cursor. Setting the time-cursor to the future allows the user to see documents in the future part of the stream. Creating a document in the future results in a document with a future timestamp. Once the user is finished time-tripping, the user can reset to the present time by selecting the "Set time to present" menu option in the time menu.

In one embodiment of the present invention "browse cards" 100 are employed so that when the user touches a document in the stream-display with the cursor, a browse card appears. The purpose of the browse card is to help the user identify a document by providing the user some idea of the document's contents in a small window. The content of browse cards is an abbreviated version of a document which as been compressed into an micro-document like an index card. In one embodiment, the browse card creation operation does header stripping so that the browse card displays the first non-trivial words in a document. In another embodiment, complex analysis is performed on the document contents so that 'most important' words, pictures and/or sounds are presented.

Another embodiment of the present invention provides "calling cards" which represent or point to a stream or substream Every stream has a calling card and the only way to reference a stream is via this calling card. In this embodiment the find operation performs as follows: (1) the user provides a search query; (2) an appropriate substream is generated; (3) the substream's calling card is generated; and (4) the new calling card is deposited as a new document at the head of the main stream. Every duplicated calling card bears on the face text, an icon or both. In the case of the find operation, the new calling card is marked with the argument supplied by the user for the search query, for example "from: Schwartz and Lifestreams"or "last letter from Piffel". As a default in this embodiment, the interface will automatically display the new substream.

Another embodiment of the present invention allows documents to be grouped explicitly into a substream. With this feature the user marks, that is, selects all documents to be included in the substream and groups the selected documents into a substream by creating a new calling card. The new calling card comes equipped with a system-created icon which is marked on all documents that are part of the new stream and the user may add any other notation to the face of the new calling card, for example, "these should be merged together to produce the Zeppelin report."

In the embodiments with calling cards the "transfer" operation takes two arguments: a document and a calling card so that the document is copied onto the stream designated by the calling card. The document may itself be a calling card and depending on instructions from the user, either the calling card itself or the stream designated by the calling card is copied onto the new stream.

Each main stream in this embodiment has a calling card which allows 'inter-main stream' communication. To communicate a user includes on the face of the calling card for the user's main stream whatever information the user is willing to make public. Other users wanting to send that electronic mail will need a copy of that user's calling card, which might be, for example, "Rock Q. Public, Blimp Mechanic, Passaic N.J. "

To give only limited access to user's stream, a user provides a copy of the calling card customized to provide the desired access. Minimal access gives other users append-only privileges, that is, user B can send user A mail, but cannot view anything on user A's stream. Access restrictions beyond "minimal" are stated in terms of substreams. In other words, a calling card gives access to all documents contained in the specified substream unless that document is also contained on one of specified excluded substreams.

The present invention allows a stream document to contain another stream, that is a 'stream envelope'. A stream envelope is equivalent to a 'value' calling card versus the 'reference' calling cards discussed above. In other words, rather than point to another stream with a calling card, the stream envelope contains a copy all the documents from the other stream. For example, user A transfers to user B a substream consisting of all Zeppelin-manual correspondence which contains many documents. However, a single new document appears on user B's stream: a stream envelope. The stream envelope may be opened yielding the many documents of the forwarded stream.

According to the present invention, a text-editor designed specifically for stream A can treat a document as a stream of bytes so that software agents designed to 'ride' streams could ride documents as well. Also, the stream find operation can scan the streamed document and synchronization based on stream properties can be applied to the streamed document.

Streams can be copied and combined into new streams, that is, streams can be merged. For example, if a user acquires stream segments from ten electronic newspapers and magazines all covering the same one-month period, the segments can be merged in a sorted order into a single combined stream.

Another feature of the present invention is a card gallery which consists of some reasonable number of microdocuments, for example twelve, arranged in such a way that each is always fully visible on the viewport for example, in two columns of 6 each at the right of the display. Each micro-document is a calling card or a micro-browse-card (MBC) to a "regular" document on the stream or in a squish. The micro browse card in the card gallery represent documents a user has been working on. Whenever a user opens a document or creates a substream or squish, the corresponding micro browse card is added to the card gallery. A user can re-open the document, squish or have the viewport display the substream, by clicking on, or otherwise selecting, the corresponding micro browse card.

The micro browse card is administered as a least-recently-used cache, that is, new cards are dealt on top of the least-recently-used existing card, however, users can override this mechanism and place or lock a card in the gallery. For example, a live squish can act as weather-station, appointment calendar, stock ticker or other current-status reporter if the user locks the micro browse card for the squish in the gallery.

Because a users'card gallery includes by default the calling cards of streams the user has recently opened, the card gallery acts, to the extent streams are used as Web sites, as a World Wide Web "hot list."

In one embodiment of the present invention at least some part of the stream is in the form of a receding stack of upright rectangles, framed in such a way that only the top line of each document is visible. A foreshortened viewing angle yields a view that is approximately a right triangle, the bottom edge aligned with the bottom of the display and the left edge aligned with the display's left border.

In another embodiment of the inventive operating system a 'slide rule' bar display is provided which is labelled with the endpoints of the stream, that is, the dates of the farthest-past and farthest-future documents. The document density can be illustrated, for example, by the amount of color saturation of the bar at any point. This type of display aids the user because some days, weeks, months or other time period have more associated documents, some have fewer. The slide rule has a magnifier that the user can slide via a mouse, for example up and down the bar. The magnifier obscures the portion of the sliderule that lies beneath, but the obscured segment is replaced by an enlarged view of the small part of the stream starting at the point touched by the upper edge of the magnifier or, some similar protocol for defining the starting point of the magnified segment. By sliding the magnifier, you change the part of the stream currently displayed in the main perspective view.

In another embodiment of the present invention at least some part of the stream is in the form of a conventional calendar month display. With this display, the stream-segment associated with day n appears as a list of document headers in n's calendar box.

To contemplate the future instead of the past, according to one embodiment of the present invention, a user can reverse the stream so that the head of the stream now appears in front, with the nearest-future document immediately behind that document, next-nearest behind that and so forth. The user then looks from the present into the future so that furthest-away document in the display equals furthest-away in future time.

All documents older than some date d may be moved by the server from immediately-accessible storage to cheaper, long-term storage. When a document is archived in this way, however, the browse card of that document may remain available in immediately-accessible storage, so that the archived document appears in the regular way in the viewport. When a user opens an archived document, the user may incur some delay as the server locates and reloads the body of the document.

Automatic archiving is a feature of the standalone embodiment and user-managed web site embodiment. In either embodiment, the streams operating system monitors remaining disk space and when available space is low, the operating system asks the user to pop in some diskettes or other storage media. Similarly when an archived document needs to be reloaded, the operating system tells the user which diskettes or other storage media to insert.

In another embodiment of the present invention a chat feature is provided. If two users want to chat online in UNIX TALK style; the user creates a new stream and each user focusses the viewport on that new stream. To make a comment, a user pops a new document on the stream head with the comment contained as text inside the document. The stream synchronization properties allow many users to manipulate a stream concurrently, and allow a user to block at the end waiting for the arrival of a new document which would mean in this case awaiting the next comment.

A chat stream by its nature provides: (1) permanent record and (2) support for multiple parties to a conversation. A chat stream is in this sense is a real-time bulletin board. In this regard a network bulletin board may be stored in a stream providing: (1) archived comments that can be searched and retrieved using the standard streams operations; (2) synchronization characteristics like a chat stream; and (3) a bulletin board that can be located via the find operation.

In another embodiment of the present invention any software agent with the necessary access can ride your stream. Therefore streams can be the basis of groupware systems implemented for example as a flock of agents. For example, when user A's wants to schedule a meeting, a software agent departs from user A's stream to visit the streams of each of the other intended participants. Each user's stream lists the current appointments in the stream's future portion, and each user also includes a document giving the user's general availability in pre-arranged terms so that the meeting-maker software agent can understand.

When the software agent finds an appropriate meeting time, the software agent posts a document to each stream's future and creates a new stream for the meeting itself. The software agent forwards the calling card of the meeting stream to each participant. This new stream serves as a chat stream on which the participants can discuss the meeting beforehand, accumulate any material developed during the meeting itself and persists when the meeting is over as a record and a vehicle for post-meeting discussions.

In the following embodiments a stream naturally provides a structure for storing technical an electronic versions of a newspaper or magazine.

In addition, a mail-order firm might store its catalog in a stream with each document describing one item. A top page can embed calling cards as hyperlinks so that the streams pointed-to are updated automatically by the persistent substream mechanism. Each user can also reformat the catalog to taste by creating a substream containing descriptions of whatever sort of object interests the user.

In another embodiment of the present invention a phone conversation is stored as a time-ordered sequence of spoken sounds or as electronic representations. When two users want to have a phone conversation, the users can use software such as a software agent, that creates a new stream and hands each user the calling card. Each user's 'phone agent' tosses digitized representations of speech frames onto the stream and grabs each new frame that appears, turning each speech frame into sound. In this scheme, phone and voicemail are integrated in the all-purpose stream context and can be manipulated using the standard stream operations.

Additionally, in another embodiment of the present invention a television source can be stored as a time-ordered sequence of sound-and-image frames. Such television information is an archive as well as a realtime source and can be searched and substreamed. A television set is merely a viewport. Also, scheduling information can be stored in the television stream's future and tuning into a television station only requires double-clicking on the appropriate calling card. Similar embodiments can provide for radio stations, music sources, etc.

A stream according to the present invention can be controlled by a voice-interface as well as a computer and thereby be accessed via a conventional phone. The voice interface would allow: (1) the stream to be searched and manipulated; (2) new objects to be installed; (3) objects to be transferred; and (4) other capability.

The following embodiment discusses how the present invention is used for electronic mail. To send a message, the user creates a new document, for example by clicking on the New button and composes the message using a favorite editor. After composition, the message document is sent with a push of the Xfer button. Similarly, existing documents are easily forwarded to other users, or can be cloned and replied to. While all mail messages, both incoming and outgoing, are intermixed with other documents in the stream, the user can create a mailbox by substreaming on documents created by other users. A user can also create substreams that contain a subset of the mailbox substream, such as "all mail from Bob", or "all mail I haven't responded to".

With the present invention, a reminder can be generated as future electronic mail, that is a user can send mail that will arrive in the future. If the user dials to the future before writing a message document, when the message document is transferred the message document will not appear on recipient's stream until either that time arrives or the recipient happens to dial the recipient's viewport to the set creation date. In the present, the document will be in the stream data structure but the viewport will not show the document. By appearing just-in-time and not requiring the user to switch to yet another application, these reminders are more effective than those included in a separate calendar or scheduling utility program.

Figures 6A, 6B:
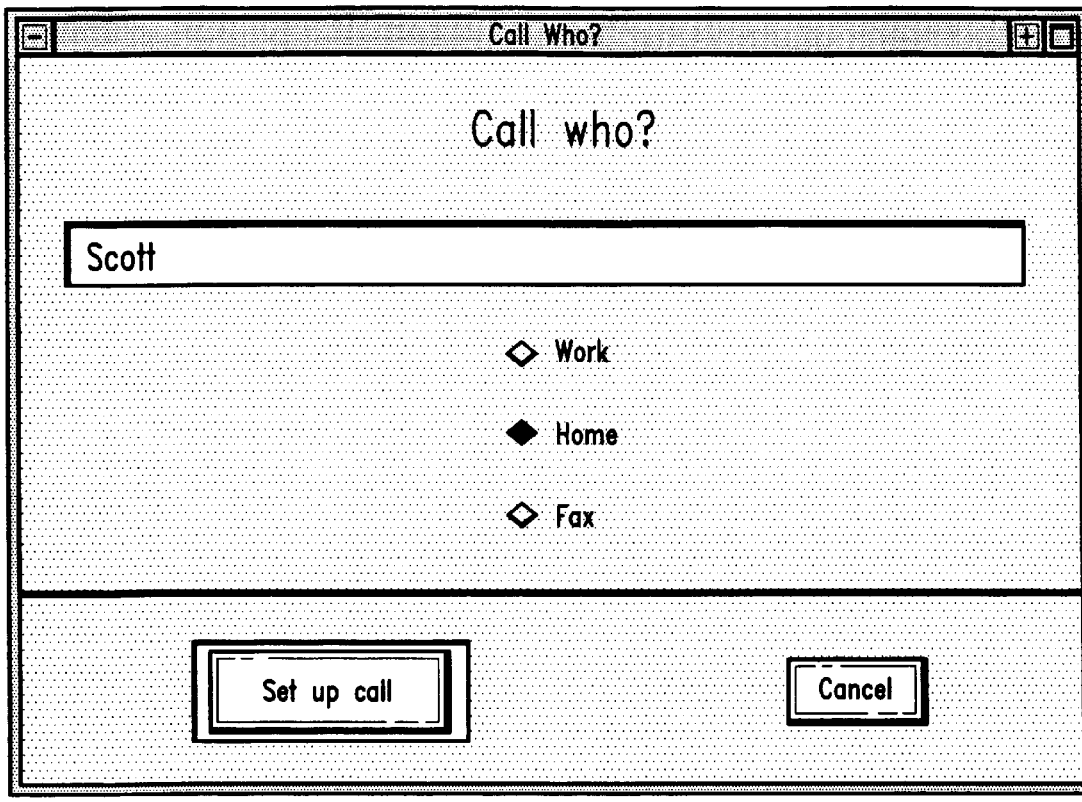
FIG. 6a shows a dialog box in connection with a phone call in one embodiment of the present invention.
FIG. 6b shows a summary of phone calls in one embodiment of the present invention.
Figures 7, 8A:
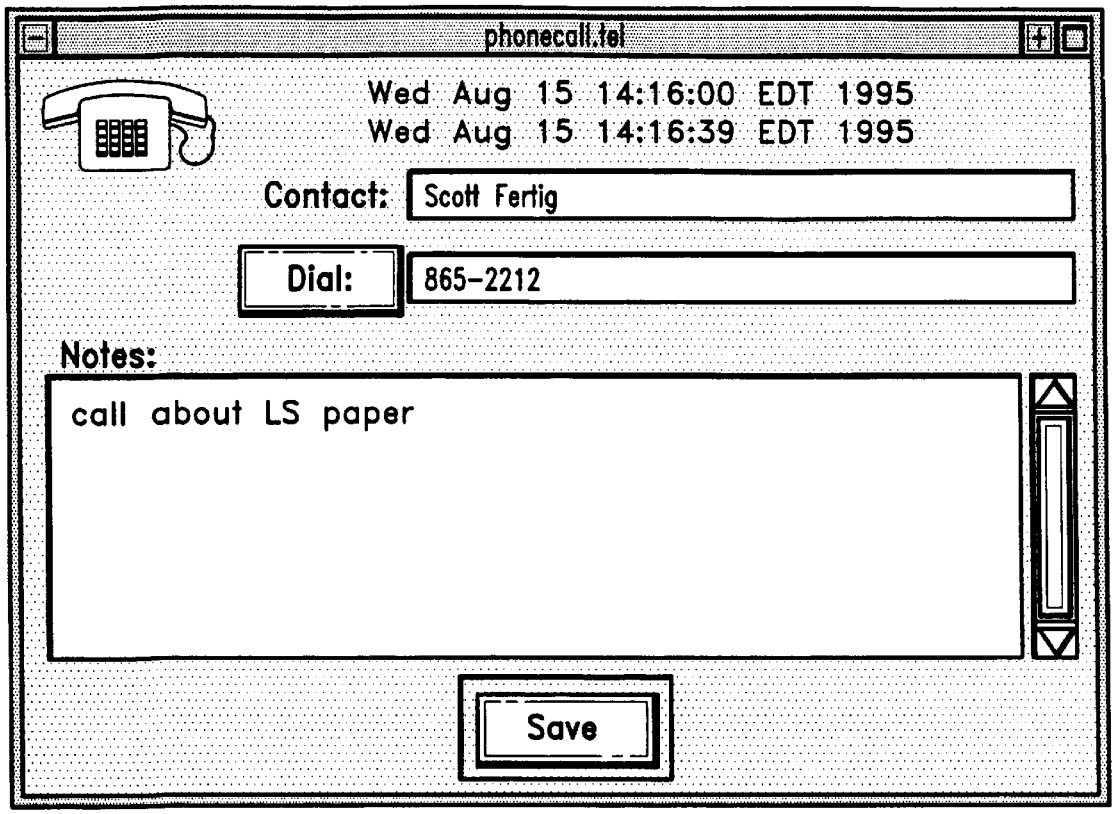
FIG. 7 shows a phone call record dialog box in one embodiment of the present invention.
FIG. 8a shows text data used by one embodiment of the present invention.

One embodiment of the present invention supports an electronic business cards document type as well as a 'phone call record' document for noting the date and time of phone contacts. In addition, the task of creating a phone call record is automated through a personal agent. The personal software agent is automatically attached to the personal agent menu so that anytime a user wants to make a call the use chooses "Make Phonecall" from the personal agent menu. The agent is spawned and the dialog box in FIG. 6a appears. The user types in the name of the callee and the agent searches the current stream for a business card with that name. If the name is found, the software agent creates and fills in the appropriate entries of the phone call record as seen in FIG. 7. This functionality is similar to the use of the personal assistant on the Newton personal digital assistant. The user can later use the streams summarize operation to summarize the phone calls made. This results in a report as shown in FIG. 6b.

In another embodiment of the present invention this functionality is extended to include the functions of a time manager. Time managers generally track the billable hours a professional spends on one or more projects. In streams this is easily accomplished by creating a timecard that marks the starting and ending time of each task. These timecards are just thrown onto the stream as used. Then, before each billing period, the stream is summarized by the timecards, resulting in a detailed billing statement for each contract.

Another embodiment of the present invention organizes a user's personal finance. Large number of users already track their checking accounts, savings, investments, and budgets with applications such as QUICKEN. The types of records and documents used in these applications such as electronic checks, deposits, securities transactions, reports are conveniently stored and generated by streams.

Figure 8B:
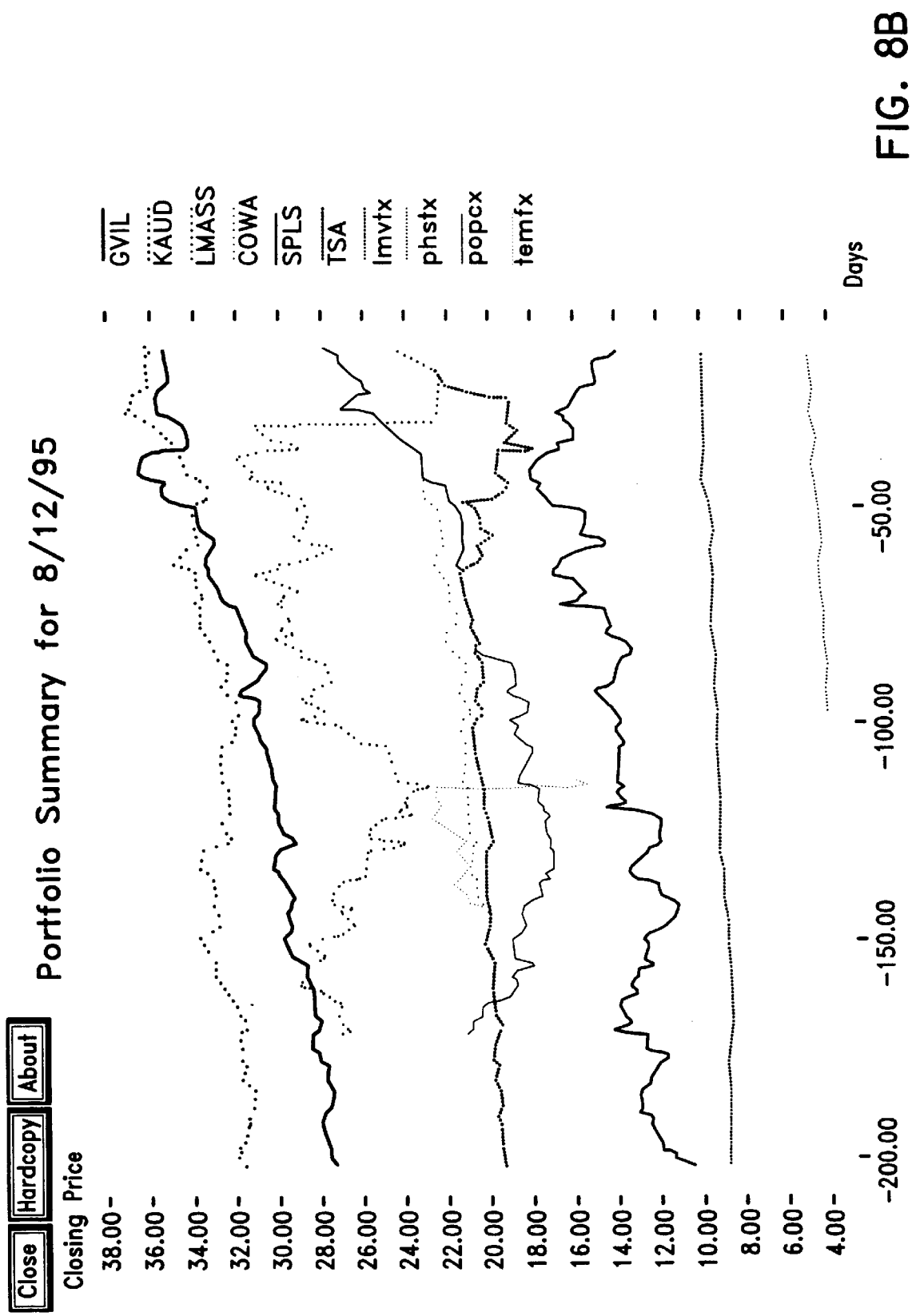
FIG. 8b shows the result of a summarize operation in one embodiment of the present invention.

For example, a stock quote service may forward the daily closing prices of a given portfolio to a user's stream at the end of every business day. These documents are as shown in FIG. 8a. Such documents can list each stock and mutual fund along with its closing price, giving the user a method of calculating the value of the user's assets on a specific day. But if the user wants higher-level view of the portfolio over time the summarize operation can be used. For example, the user first selects a substream containing the stock quote documents and selects the "summarize by portfolio" menu item. This operation compresses the data into a single chart of historical data which summarize the portfolio documents in the substream. This result is illustrated in FIG. 8b.

Another embodiment of present invention provides a stream-based checking account. Each check written creates a record on the users stream. Some of these checks are electronic checks sent to companies with an online presence; other checks are transcribed from written checks. The user, in this embodiment, employs a personal software agent to help balance his checkbook. At year's end the user runs a tax summary which squishes the financial information in the users stream onto income tax forms which can be sent electronically to the Internal Revenue Service.

Streams can also be used for budgeting, tracking expenditures, etc. Streams contain everything a user deals with in the user's electronic life in a convenient and searchable location.

As discussed previously, every user can send out custom calling cards that grant access to a user's stream. Thus, the particular user's stream can function as a personal World Wide Web site such that the web site is merely a subset of the user's main stream or a substream. For the convenience of external users, a user can generate a "guide to this stream" document that functions as a top page. In the context of the present invention, a hyperlink, or a bookmark is just a calling card. By double clicking, or some comparable mechanism, on a calling card the viewport displays the specified stream. Embedding a link from one document to another document means to embed calling cards.

The present invention's personal web site provides more features than a conventional worldwide user side because: (1) the web site and personal information site are unified and maintained simultaneously with the same toolset; (2) visitors to the site use the same interface as for the visitor's own stream, that is, the visitor can browse, create substreams and squish; (3) visitors can be given customized access levels so that friendly visitors get to see more; and (4) the personal web site can filter incoming documents.

Streams of the present invention are designed to work with conventional World Wide Web browsers, thus opening a document of type web bookmark causes the appropriate browser to fire-up as an application the way a text editor fires up when the user opens a text document. However, streams also provide an indigenous web-browsing model. Key features such as calling cards and find provide this functionality so that the viewport itself functions as the browser.

Streams may also be quite useful for managing information outside of the system. For example, keeping track of web bookmarks is difficult and bookmarks are inconvenient to pass to other users. Conventional systems accomplish those transactions by copying a Web address from a web browser to an electronic mail message which the recipient then copies from electronic mail back to recipient's browser and adds this web address as a bookmark. Streams solve both of these problems.

In one embodiment, an agent watches each user's bookmark file for each time a new bookmark is added and then adds the same bookmark to a stream as a new Web address document. The effect of opening a Web address document in a stream is that the web browser comes to the foreground and attempts to connect to the Web address. In this way streams create a bookmark substream while at the same time making the data in the bookmarks readily available to any other search a user may make.

Passing Web addresses around is trivial, the user merely copies the Web address document to another user's stream (a one-step process) and the Web address is automatically included in the recipient bookmark substream.

A stream is a data structure that can be examined and to the extent possible manipulated by many processes simultaneously. Also a process may block the end of a stream, that is, suspend the stream operation, until awakened when a new document appears on the stream head. Streams need to support the block-at-the-end operation so that a software agent or what amounts to the same thing, that is, a substream or a live squish document can examine each new document arriving at the stream.

A stream must support simultaneous access because: (1) a user creates many software agents which may need to examine the stream concurrently; and (2) a user may have granted other users limited access to the user's stream, and the user will want access to this stream even while the other users access the stream.

One embodiment of the present invention is configured such that each server may support three to four simultaneous users with stream sizes on the order of 100,000 documents (perhaps a year or two of documents for the average user) In another embodiment, the operating system is configured such that lifestreams may have millions of documents or more. The substreaming aspect of one embodiment of the present invention is efficiently implemented using an inverse index of the document collection maintained by the server. No real performance problems with respect to retrieval have occurred. Given the very large indices that are being used on the Internet the retrieval scheme is expected to scale to large document collections.

Since a user is unlikely look at 10,000 documents at once and discern any usable information, the present invention does not provide the user with an entire document collection at once. Instead "cursors" are used to allow the user to view segments of the document collection and to load in more segments as needed.

One embodiment of the invention provides a single-threaded server which allows a single point of access. Other embodiments of the present invention utilize a multi-server and multi-threaded approach which provides a more scalable architecture.

Regarding the term "agent" used in this application, it is noted that this term refers one of three kinds of embedded computations: personal agents, document agents, and stream agents. Personal agents are typically attached to the user interface and can automate tasks or can learn from the user's interactions with streams. Document agents live on documents and are spawned by various events, for example, the first time that a document is accessed. Stream agents are attached to streams and execute whenever the stream changes in some way, for example, a new document appears on the stream.

Further, regarding the term "document", it is noted that this term includes traditional text based files, electronic mail files, binary files, audio data, video data, and multimedia data.

Additionally, this document stream operating system can be implemented as an independent operating system with all required subsystems such as: a storage subsystems in software and/or hardware for writing documents to disc drive, tape drives and the like; interrupt handling subsystems; and input/output subsystems. However, the present invention also encompasses implementations which utilize subsystems from other operating systems such as the Disk Operating System (DOS), WINDOWS, and OPERATING SYSTEM 7. In such implementations, the graphic user interface (GUI) of the other operating system can be replaced by the present invention viewports. Alternatively, the present invention can operate as a document stream utility for the other operating system.

It must be noted that although the present invention is described by reference to particular embodiments thereof, many changes and modifications of the invention may become apparent to those skilled in the art without departing from the spirit and scope of the invention, which is only limited by the appended claims. For documents may have associated attributes used to locate the document during a search, for example, a special code word selected by the user.

REFERENCES

[1] Theodor Nelson. The right way to think about software design. In The Art of Human-Computer Interface Sesign (Ed.) Brenda Laurel, 1990.

[2] Thomas W. Malone. How do people organize their desks? Implications for the design of office information systems. ACM Transactions on Office Systems, 1(1):99–112, January 1983.
[3] M. Lansdale. The psychology of personal information management. Applied Ergonomics, March 1988.
[4] David Gelernter. The cyber-road not taken. The Washington Post, April 1994.

What is claimed is:

1. A stream-based operating system utilizing subsystems from another operating system running a computer, comprising:
   a document organizing facility receiving documents created by diverse applications in diverse formats specific to the respective applications;
   said document organizing facility automatically associating respective selected indicators with the received documents, automatically archiving the documents and indicators in consistent format for selective retrieval, and automatically creating information specifying respective glance views of said documents and respective document representations of said documents;
   a display facility displaying at least selected document representations as a receding, foreshortened stack of partly overlapping document representations such that only a part of each displayed document representation, after the first in the stack, is visible to the user;
   said display facility further displaying a cursor or pointer and responding to user-controlled sliding without clicking of the cursor over said displayed stack to display a glance view of a document whose document representation is currently touched by the cursor or pointer; and
   said stream-based operating system utilizing subsystems from said another operating system for operations including writing documents to storage media, interrupt handling and input/output.

2. A stream-based operating systems as in claim 1 in which said selected indicators are time-based.

3. A stream-based operating system as in claim 1 in which said another operating system is a Windows operating system.

4. A stream-based operating system as in claim 1 in which said another operating systems is an Apple operating system.

5. A stream-based operating system as in claim 1 in which said display of said glance view comprises an abbreviated version of the respective document.

6. A stream-based operating system as in claim 1 in which said display of a glance view comprises the first non-trivial words of the respective document resulting from header-stripping the document.

7. A stream-based operating system as in claim 1 in which said display of a glance view comprises important words, pictures, and/or sounds of the respective document resulting from complex analysis of the document.

8. A controlling operating system utilizing subsystems from another operating system running a computer, comprising:
   a document organizing facility receiving documents from diverse applications in diverse formats specific to the respective applications;
   said document organizing facility automatically associating selected indicators with the received documents, automatically archiving the documents and indicators in consistent format for selective retrieval, and automatically creating information specifying respective glance views of said documents and respective document representations of said documents;
   a display facility displaying at least selected ones of said document representations;
   said display facility further displaying a cursor or pointer and responding to user-controlled sliding without clicking of the cursor or pointer over the displayed document representations to display at least a glance view of a document whose document representation is currently touched by the cursor or pointer; and
   said controlling operating system utilizing subsystems from said another operating system for operations including writing documents to storage media, interrupt handling and input/output.

9. An operating systems as in claim 8 in which said selected indicators are time-based.

10. An operating system as in claim 8 in which said display facility displays said document representations as a receding, foreshortened stack of partly overlapping document representations such that only a part each but the first document representation in the displayed stack is visible to a user.

11. A stream-based operating system as in claim 8 in which said another operating system is a Windows operating system.

12. A stream-based operating system as in claim 8 in which said another operating systems is an Apple operating system.

13. A stream-based operating system as in claim 8 in which said display of said glance view comprises an abbreviated version of the respective document.

14. A stream-based operating system as in claim 8 in which said display of a glance view comprises the first non-trivial words of the respective document resulting from header-stripping the document.

15. A stream-based operating system as in claim 8 in which said display of a glance view comprises important words, pictures, and/or sounds of the respective document resulting from complex analysis of the document.

16. A controlling operating system utilizing subsystems from another operating system running a computer, comprising:
   a document organizing facility associating selected indicators with received or created documents and creating information specifying glance views of the respective documents and information specifying document representations of the respective documents;
   a display facility displaying at least selected ones of said document representations;
   said display facility further displaying a cursor or pointer and responding to a user sliding without clicking the cursor or pointer over a portion of a displayed document representation to display the glance view of the document whose document representation is touched by the cursor or pointer; and
   said controlling operating system utilizing subsystems from said another operating system for operations including writing documents to storage media, interrupt handling and input/output.

17. An operating systems as in claim 16 in which said selected indicators are time-based.

18. An operating system as in claim 16 in which said display facility displays said document representations as a receding, foreshortened stack of partly overlapping document representations such that only a part of most document representations in the displayed stack is visible to a user.

19. An operating system as in claim 16 in which said document organizing facility receives said document in formats specific to heterogeneous applications and creates said information specifying said glance views to enable display of the glance views in a consistent format.

20. A stream-based operating system as in claim 16 in which said another operating system is a Windows operating system.

21. A stream-based operating system as in claim 16 in which said another operating systems is an Apple operating system.

22. A stream-based operating system as in claim 16 in which said display of said glance view comprises an abbreviated version of the respective document.

23. A stream-based operating system as in claim 16 in which said display of a glance view comprises the first non-trivial words of the respective document resulting from header-stripping the document.

24. A stream-based operating system as in claim 16 in which said display of a glance view comprises important words, pictures, and/or sounds of the respective document resulting from complex analysis of the document.

25. A document stream operating system utilizing subsystems from another operating system running a computer, comprising:

a document organizing facility associating chronological indicators with documents received from diverse applications in diverse formats and creating information specifying glance views of the respective documents and information specifying document representations of respective documents;

a display facility displaying at least selected ones of said document representations as a receding, foreshortened stack of partly overlapping document representations such that only a part each document representation except the first one in the displayed stack is visible to a user;

said display facility further displaying a cursor or pointer and responding to a user sliding without clicking the cursor or pointer over said displayed stack of document representations to display the glance view of the document whose document representation is currently touched by the cursor; and said document stream operating system utilizing subsystems from said another operating system for operations including writing documents to storage media, interrupt handling and input/output.

26. A document operating system as in claim 25 in which said document organizing facility associates said chronological indicators with documents at the time of receipt or creation of said documents without requiring a user to name the documents.

27. A stream-based operating system as in claim 25 in which said another operating system is a Windows operating system.

28. A stream-based operating system as in claim 25 in which said another operating systems is an Apple operating system.

29. A stream-based operating system as in claim 25 in which said display of said glance view comprises an abbreviated version of the respective document.

30. A stream-based operating system as in claim 25 in which said display of a glance view comprises the first non-trivial words of the respective document resulting from header-stripping the document.

31. A stream-based operating system as in claim 25 in which said display of a glance view comprises important words, pictures, and/or sounds of the respective document resulting from complex analysis of the document.

32. A method of displaying heterogenous documents from different applications in a receding, foreshortened stack of selected document representations of said documents and providing a set of commands applicable to the document representations in the stack, comprising:

first displaying document representations of said documents received from different applications as a receding, foreshortened stack of partly overlapping document representations such that only a part of each of most document representations in the displayed stack is visible to the user;

said stack being in a time order related to respective time-based indicators automatically associated with the documents at the time of receipt or creation thereof;

subsequently, while displaying the stack of document representations, responding automatically to touching a document representation in the stack with a user-operated cursor or pointer, without further action by the user, to display separately from the displayed stack of document representations, a glance view of the document whose document representation is currently touched by the cursor or pointer, said glance view being displayed while the displayed stack of document representations remains visible; and concurrently with displaying said glance view, displaying in the same display a set of command buttons, said command buttons being responsive to user clicks to cause respective operations to be performed on the document whose glance view is displayed at the time.

33. A method as in claim 32 in which said displaying of document representations comprises displaying at least the top line of each document whose document representation is displayed in the stack.

34. A method as in claim 32 including visually identifying attributes of selected documents in the displayed stack of document representations by markings that are visible in the displayed stack, each marking being common to a class of documents.

35. A method as in claim 34 in which said markings comprise coloring of visible portions of selected document representations in the stack.

36. A method as in claim 35 in which said coloring comprises providing selected document representations in the displayed stack with borders of at least one selected color.

37. A stream-based operating system as in claim 32 in which said display of said glance view comprises an abbreviated version of the respective document.

38. A stream-based operating system as in claim 32 in which said display of a glance view comprises the first non-trivial words of the respective document resulting from header-stripping the document.

39. A stream-based operating system as in claim 32 in which said display of a glance view comprises important words, pictures, and/or sounds of the respective document resulting from complex analysis of the document.

* * * * *

(12) EX PARTE REEXAMINATION CERTIFICATE (9954th)
United States Patent
Freeman et al.

(10) Number: US 6,725,427 C1
(45) Certificate Issued: Nov. 21, 2013

(54) DOCUMENT STREAM OPERATING SYSTEM WITH DOCUMENT ORGANIZING AND DISPLAY FACILITIES

(75) Inventors: Eric Freeman, Branford, CT (US); David H. Gelernter, Woodbridge, CT (US)

(73) Assignee: Mirror Worlds, LLC, Tyler, TX (US)

Reexamination Request:
No. 90/011,347, Nov. 19, 2010

Reexamination Certificate for:
Patent No.: 6,725,427
Issued: Apr. 20, 2004
Appl. No.: 10/013,150
Filed: Dec. 10, 2001

Related U.S. Application Data

(60) Division of application No. 09/398,611, filed on Sep. 17, 1999, now Pat. No. 6,638,313, which is a continuation of application No. 08/673,255, filed on Jun. 28, 1996, now Pat. No. 6,006,227.

(51) Int. Cl.
G06F 17/30 (2006.01)

(52) U.S. Cl.
CPC .... *G06F 17/30011* (2013.01); *G06F 17/30126* (2013.01); *G06F 17/30235* (2013.01); *G06F 17/3061* (2013.01)

USPC ........... 715/273; 707/E17.008; 707/E17.058; 715/275

(58) Field of Classification Search
None
See application file for complete search history.

(56) References Cited

To view the complete listing of prior art documents cited during the proceeding for Reexamination Control Number 90/011,347, please refer to the USPTO's public Patent Application Information Retrieval (PAIR) system under the Display References tab.

*Primary Examiner* — Christopher E Lee

(57) ABSTRACT

A document stream operating system and method is disclosed in which: (1) documents are stored in one or more chronologically ordered streams; (2) the location and nature of file storage is transparent to the user; (3) information is organized as needed instead of at the time the document is created; (4) sophisticated logic is provided for summarizing a large group of related documents at the time a user wants a concise overview; and (5) archiving is automatic. The documents can include text, pictures, animations, software programs or any other type of data.

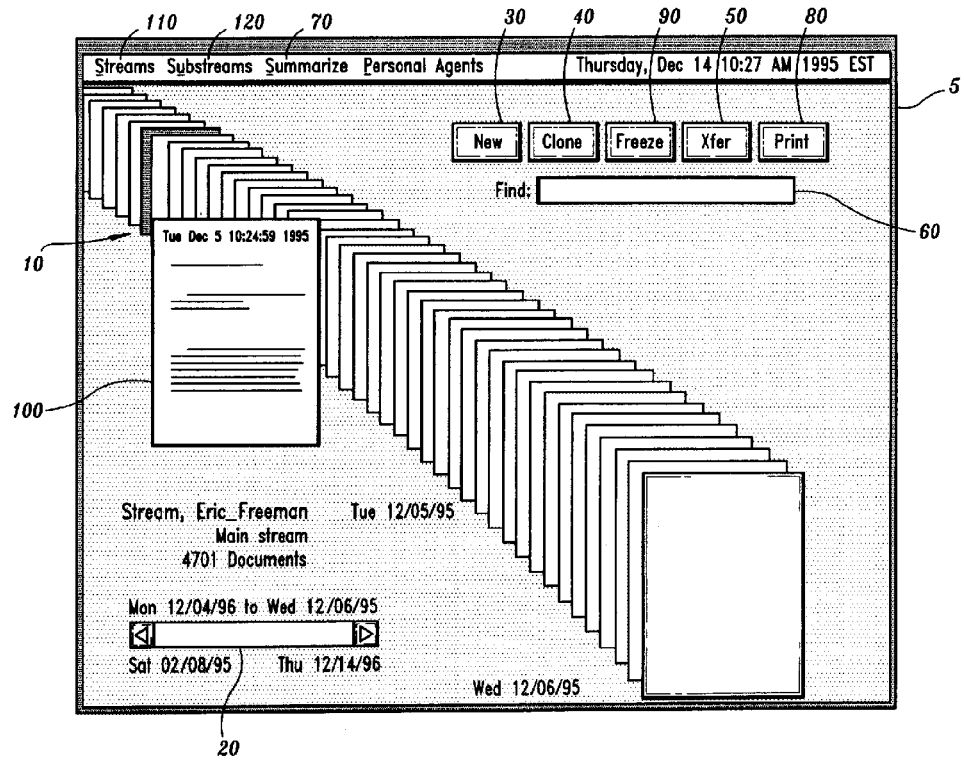

US 6,725,427 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 18 and 25 is confirmed.

Claims 8 and 16 are cancelled.

New claims 40-69 are added and determined to be patentable.

Claims 2-7, 9-15, 17, 19-24 and 26-39 were not reexamined.

40. *The system of claim 1 further comprising an index of contents of said documents for use in the selective retrieval of archived documents in response to selected search criteria applied to the archived documents.*

41. *A controlling operating system utilizing subsystems from another operating system running a computer, comprising:*

*a document organizing facility associating selected indicators with received or created documents and creating information specifying glance views of the respective documents and information specifying document representations of the respective documents;*

*a display facility displaying at least selected ones of said document representations;*

*said display facility further displaying a cursor or pointer and responding to a user sliding without clicking the cursor or pointer over a portion of a displayed document representation to display the glance view of the document whose document representation is touched by the cursor or pointer; and*

*said controlling operating system utilizing subsystems from said another operating system for operations including writing documents to storage media, interrupt handling and input/output;*

*wherein*

*said document display facility is further configured to display selected ones of said document representations as a sequence of overlapping document representations; and*

*said document display facility includes a user interface element and is further configured to display one or more additional ones of said document representations as a part of the same sequence of overlapping document representations in response to a user selecting, through the user interface element, the one or more additional document representations;*

*wherein said user interface element is a scroll bar; and*

*wherein said display facility is further configured to respond to a user operating said scroll bar to display only a selected segment of the sequence of document representations.*

42. *A controlling operating system utilizing subsystems from another operating system running a computer, comprising:*

*a document organizing facility associating selected indicators with received or created documents and creating information specifying glance views of the respective documents and information specifying document representations of the respective documents;*

*a display facility displaying at least selected ones of said document representations;*

*said display facility further displaying a cursor or pointer and responding to a user sliding without clicking the cursor or pointer over a portion of a displayed document representation to display the glance view of the document whose document representation is touched by the cursor or pointer: and*

*said controlling operating system utilizing subsystems from said another operating system for operations including writing documents to storage media, interrupt handling and input/output;*

*wherein*

*said document display facility is further configured to display selected ones of said document representations as a sequence of overlapping document representations, and*

*said document display facility includes a user interface element and is further configured to display one or more additional ones of said document representations as a part of the same sequence of overlapping document representations in response to a user selecting, through the user interface element, the one or more additional document representations; and*

*wherein said document display facility is further configured to respond to a user operation of said user interface element to select for concurrent display only a segment of the sequence of document representations.*

43. *A controlling operating system utilizing subsystems from another operating system running a computer, comprising:*

*a document organizing facility associating selected indicators with received or created documents and creating information specifying glance views of the respective documents and information specifying document representations of the respective documents;*

*a display facility displaying at least selected ones of said document representations;*

*said display facility further displaying a cursor or pointer and responding to a user sliding without clicking the cursor or pointer over a portion of a displayed document representation to display the glance view of the document whose document representation is touched by the cursor or pointer; and*

*said controlling operating system utilizing subsystems from said another operating system for operations including writing documents to storage media, interrupt handling and input/output;*

*wherein*

*said document display facility is further configured to display selected ones of said document representations as a sequence of overlapping document representations; and*

*said document display facility includes a user interface element and is further configured to display one or more additional ones of said document representations as a part of the same sequence of overlapping document representations in response to a user selecting, through the user interface element, the one or more additional document representations; and*

*wherein said display facility is further configured to display said sequence of overlapping document representations using perspective to create the illusion of* increasing distance from a viewpoint implied by the displayed document representations.

44. The system of claim 16 further comprising:
a search facility operable to identify documents among the received or created documents based on search criteria;
wherein said displayed selected ones of said document representations are document representations for some, but not all, of a set of documents identified by the search facility in response to specific search criteria; and
said document display facility includes a user interface element and is further configured to display document representations for one or more additional ones of the documents in the set in response to a user selecting, through said user interface element, the one or more additional document representations.

45. The system of claim 44 wherein said document display facility is further configured to display the selected ones of said document representations as a sequence of overlapping document representations.

46. The system of claim 45 wherein said user interface element is a scroll bar.

47. The system of claim 46 wherein said display facility is further configured to respond to user operation of said scroll bar to select for display only a selected segment of the sequence of document representations.

48. The system of claim 45 wherein said display facility is further configured to display the sequence of overlapping document representations using perspective to create the illusion of increasing distance from a viewpoint implied by the displayed document representations.

49. The system of claim 44 wherein said document display facility includes a scroll bar operable by the user to select for display a segment of the sequence of document representations.

50. The system of claim 16 wherein the display facility is configured to display a sequence of overlapping document representations using perspective to create the illusion of increasing distance from a viewpoint implied by the displayed document representations.

51. The system of claim 16 wherein the at least selected ones of said document representations includes at least one document representation for a document associated with a future time.

52. The system of claim 25 wherein
said document display facility includes a user interface element and is further configured to display one or more additional ones of said document representations as part of the same stack of overlapping document representations in response to a user selecting through the user interface element the one or more additional document representations.

53. The system of claim 52 wherein the user interface element is a scroll bar.

54. The system of claim 53 wherein said display facility is further configured to respond to a user operating said scroll bar to select for display only a selected segment of the document representations.

55. The system of claim 25 wherein said document display facility is further configured to display selected ones of the document representations as partly overlapping representations that extend from one representation to another in a horizontal direction on a display screen.

56. The system of claim 25 further comprising
a search facility operable to identify documents among the received or created documents based on search criteria;
wherein said selected ones of said document representations displayed by said display facility are document representations for some, but not all, of a set of documents identified by the search facility in response to specific search criteria; and
said document display facility includes a user interface element and is further configured to display document representations for one or more additional ones of said documents in the set in response to a user selecting through the user interface element the one or more additional document representations.

57. The system of claim 56 wherein the user interface element is a scroll bar.

58. The system of claim 57 wherein the scroll bar is operable by the user to select for display only a selected segment of the document representations.

59. The system of claim 56 including a scroll bar operable by the user to select for display only a segment of the document representations that includes less than all of the document representations.

60. The system of claim 25 wherein the at least selected ones of said document representations includes at least one document representation for a document associated with a future time.

61. A method as in claim 32 including:
providing a computer system with documents from diverse applications in respective formats unique to the respective applications
causing the computer system to automatically, without user interaction and without requiring a user to designate directory structures or other preimposed document categorizations, create a main stream of the provided documents;
said main stream being unbounded and accommodating documents associated with past, present and future times;
said main stream being maintained and being selectively retrievable and searchable by the computer system;
said computer system maintaining the main stream live and responsive to subsequent events by automatically incorporating therein new documents as provided to the computer system while maintaining a time order of the documents in the stream;
providing selected search criteria;
causing said computer system to create a substream based on the provided search criteria.
further causing said computer system to maintain said substream live and responsive to subsequent events by automatically incorporating therein new document provided to the computer system that meet the search criteria.
selecting said main stream or said substream for display of document representations thereof as said receding, foreshortened stack of document representations.

62. The method of claim 32 further comprising
displaying one or more additional document representations as part of the same stack of overlapping document representations in response to a user selecting through a user interface element the one or more additional ones of said document representations.

63. The method of claim 62 including selecting said additional document representations through a user operation of a scroll bar interface element.

64. The method of claim 63 including selecting for display only a segment of said document representations though a user operation of a scroll bar user interface element.

65. The method of claim 62 wherein said displaying of a stack of document representations include spacing the displayed document representations from each other in a horizontal direction of a display screen.

66. The method of claim 32 further comprising
identifying a set of documents among the received or created documents based on search criteria provided by the user;
displaying document representations for some, but not all, of the set of documents identified in response to the search criteria; and
further displaying document representations for one or more additional ones of the documents in the set in response to a user selecting through a user interface element the one or more additional document representations.

67. The method of claim 66 wherein the selecting of additional document representations comprises responding to user operation of a scroll bar interface element.

68. The method of claim 66 wherein displaying comprises responding to user operation of a scroll bar user interface element to select for display only a segment of said document representations.

69. The method of claim 32 wherein the displayed stack of document representations includes at least one document representation for a document associated with a future time.

\* \* \* \* \*

US 006725427C2

(12) INTER PARTES REEXAMINATION CERTIFICATE (942nd)

United States Patent
Freeman et al.

(10) Number: US 6,725,427 C2
(45) Certificate Issued: Aug. 22, 2014

(54) DOCUMENT STREAM OPERATING SYSTEM WITH DOCUMENT ORGANIZING AND DISPLAY FACILITIES

(75) Inventors: Eric Freeman, Branford, CT (US); David H. Gelernter, Woodbridge, CT (US)

(73) Assignee: Mirror Worlds, LLC, Tyler, TX (US)

Reexamination Request:
No. 95/001,172, Apr. 23, 2009

Reexamination Certificate for:
Patent No.: 6,725,427
Issued: Apr. 20, 2004
Appl. No.: 10/013,150
Filed: Dec. 10, 2001

Reexamination Certificate C1 6,725,427 issued Nov. 21, 2013

Related U.S. Application Data

(60) Division of application No. 09/398,611, filed on Sep. 17, 1999, now Pat. No. 6,638,313, which is a continuation of application No. 08/673,255, filed on Jun. 28, 1996, now Pat. No. 6,006,227.

(51) Int. Cl.
*G06F 17/30* (2006.01)

(52) U.S. Cl.
CPC ... *G06F 17/30011* (2013.01); *Y10S 707/99932* (2013.01)
USPC ............ 715/273; 707/E17.008; 707/E17.058; 715/275; 707/999.002

(58) Field of Classification Search
None
See application file for complete search history.

(56) References Cited

To view the complete listing of prior art documents cited during the proceeding for Reexamination Control Number 95/001,172, please refer to the USPTO's public Patent Application Information Retrieval (PAIR) system under the Display References tab.

*Primary Examiner* — Christopher E. Lee

(57) ABSTRACT

A document stream operating system and method is disclosed in which: (1) documents are stored in one or more chronologically ordered streams; (2) the location and nature of file storage is transparent to the user; (3) information is organized as needed instead of at the time the document is created; (4) sophisticated logic is provided for summarizing a large group of related documents at the time a user wants a concise overview; and (5) archiving is automatic. The documents can include text, pictures, animations, software programs or any other type of data.

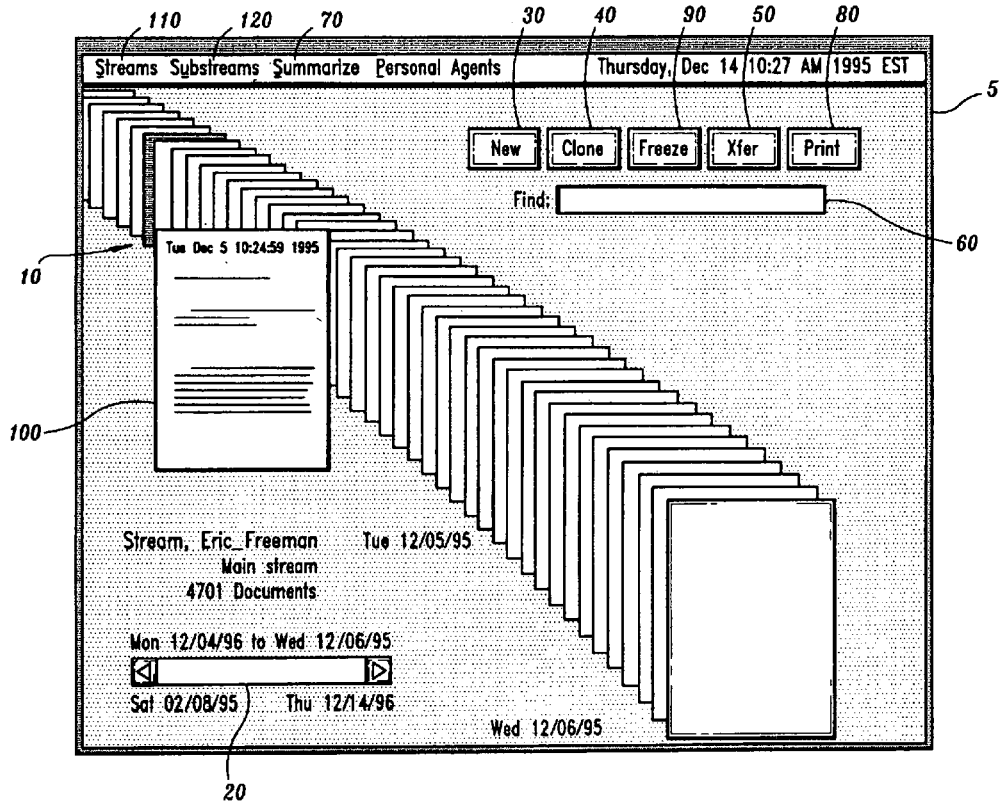

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 32-34, 37 and 39 are now disclaimed.
Claims 1-31, 35, 36 and 38 were not reexamined.

\* \* \* \* \*